(12) United States Patent
Zhang et al.

(10) Patent No.: US 11,707,755 B2
(45) Date of Patent: Jul. 25, 2023

(54) PAINTING SYSTEM

(71) Applicants: Tyco Electronics (Shanghai) Co. Ltd., Shanghai (CN); TE Connectivity Services GmbH, Schaffhausen (CH); Kunshan League Automechanism Co., Ltd., Kunshan (CN)

(72) Inventors: Rong Zhang, Shanghai (CN); Roberto Francisco-Yi Lu, Bellevue, WA (US); Dandan Zhang, Shanghai (CN); Lvhai Hu, Shanghai (CN); Haidong Wu, Kunshan (CN); Yuting He, Kunshan (CN)

(73) Assignees: TE Connectivity Solutions GmbH, Schaffhausen (CH); Kunshan League Automechanism Co., Ltd., Kunshan (CN); Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/408,854

(22) Filed: Aug. 23, 2021

(65) Prior Publication Data
US 2022/0055056 A1   Feb. 24, 2022

(30) Foreign Application Priority Data

Aug. 21, 2020   (CN) .......................... 202010848842.8

(51) Int. Cl.
*B05B 13/02*   (2006.01)
*B25J 11/00*   (2006.01)
(Continued)

(52) U.S. Cl.
CPC ............ *B05B 13/0228* (2013.01); *B05C 5/02* (2013.01); *B05C 13/00* (2013.01); *B05C 15/00* (2013.01);
(Continued)

(58) Field of Classification Search
USPC ....... 118/323, 321, 319, 320, 308, 309, 324, 118/500, 620–640, 70, 72
See application file for complete search history.

(56) References Cited

U.S. PATENT DOCUMENTS 4,934,308 A * 6/1990 Boyce ..................... B05B 16/40
118/DIG. 7
5,006,999 A * 4/1991 Kuno ................... G05B 19/425
219/124.34
(Continued)

FOREIGN PATENT DOCUMENTS

CN          2584293 Y      11/2003
CN        101637751 A      2/2010
(Continued)

OTHER PUBLICATIONS

Chinese First Office Action with English translation, Application No. 202010848842.8, dated Jun. 7, 2022, 27 pages.
(Continued)

*Primary Examiner* — Yewebdar T Tadesse
(74) *Attorney, Agent, or Firm* — Barley Snyder

(57) ABSTRACT

A painting system includes a conveying mechanism adapted to convey a workpiece to be painted to a painting station, a holding and rotating mechanism mounted at the painting station and adapted to hold and rotate the workpiece, and a robot having a nozzle adapted to spray a paint on the workpiece held by the holding and rotating mechanism. The robot is configured to spray the paint onto the workpiece while the holding and rotating mechanism rotates the workpiece, spraying a layer of the paint on an outer surface of the workpiece.

19 Claims, 2 Drawing Sheets

(51) Int. Cl.
*B25J 9/00* (2006.01)
*B25J 5/02* (2006.01)
*B05C 15/00* (2006.01)
*B65G 23/32* (2006.01)
*B05C 5/02* (2006.01)
*B05C 13/00* (2006.01)
*B65G 19/02* (2006.01)

(52) U.S. Cl.
CPC ............... *B25J 5/02* (2013.01); *B25J 9/0093* (2013.01); *B25J 11/0075* (2013.01); *B65G 19/02* (2013.01); *B65G 23/32* (2013.01)

(56) References Cited

U.S. PATENT DOCUMENTS

| | | | | |
|---|---|---|---|---|
| 5,314,722 | A * | 5/1994 | Kobayashi | G05B 19/4182 901/14 |
| 6,319,563 | B1 * | 11/2001 | Skrabski | B05B 13/0442 427/407.1 |
| 9,487,857 | B2 * | 11/2016 | Perego | B05B 16/20 |
| 2014/0165907 | A1 * | 6/2014 | Furuya | B65G 47/80 118/500 |
| 2014/0285790 | A1 * | 9/2014 | Nishiyama | H01L 21/67178 355/72 |
| 2020/0324404 | A1 * | 10/2020 | Yoshino | B25J 9/1682 |

FOREIGN PATENT DOCUMENTS

| | | |
|---|---|---|
| CN | 201676807 U | 12/2010 |
| CN | 202655165 U | 1/2013 |
| CN | 204412519 U | 6/2015 |
| CN | 105344519 A | 2/2016 |
| CN | 208583521 U | 3/2019 |
| CN | 209138932 U | 7/2019 |
| CN | 110899022 A | 3/2020 |
| CN | 210496992 U | 5/2020 |
| CN | 210875980 U | 6/2020 |
| JP | 2002035659 A | 2/2002 |

OTHER PUBLICATIONS

First Office Action from the CNIPA dated Oct. 28, 2022, corresponding to Application No. 202010848842.8 with English translation, 12 pages.

* cited by examiner

PAINTING SYSTEM

CROSS-REFERENCE TO RELATED APPLICATIONS

This application claims the benefit of the filing date under 35 U.S.C. § 119(a)-(d) of Chinese Patent Application No. 202010848842.8, filed on Aug. 21, 2020.

FIELD OF THE INVENTION

Embodiments of the present disclosure relate to a painting system.

BACKGROUND

A manual painting process is widely used in mass production. It is difficult, however, to control a painted material thickness on a surface and a material utilization rate is not stable. If a painting material is expensive, manual painting will waste a lot of painting material. In addition, if the painting process is performed indoors, paint particles and dust will float in the air, which risks deflagration and threatens worker health.

SUMMARY

A painting system includes a conveying mechanism adapted to convey a workpiece to be painted to a painting station, a holding and rotating mechanism mounted at the painting station and adapted to hold and rotate the workpiece, and a robot having a nozzle adapted to spray a paint on the workpiece held by the holding and rotating mechanism. The robot is configured to spray the paint onto the workpiece while the holding and rotating mechanism rotates the workpiece, spraying a layer of the paint on an outer surface of the workpiece.

BRIEF DESCRIPTION OF THE DRAWINGS

The invention will now be described by way of example with reference to the accompanying Figures, of which.

DETAILED DESCRIPTION OF THE EMBODIMENTS

Figure 1:
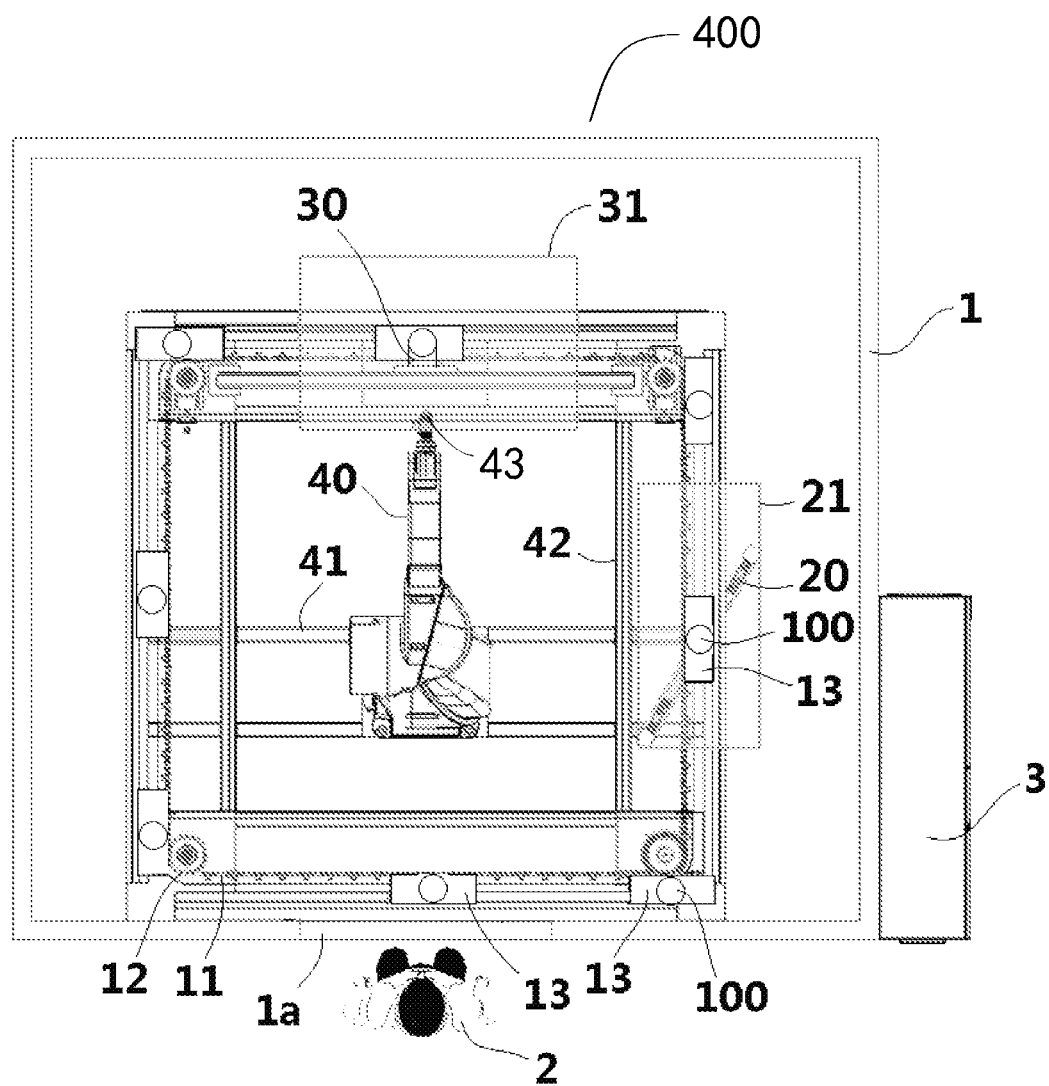
FIG. 1 is a plan view of a painting system according to an embodiment.

Technical solutions of the present disclosure will be described hereinafter in further detail with reference to the following embodiments, taken in conjunction with the accompanying drawings. In the specification, the same or similar reference numerals indicate the same or similar parts. The description of the embodiments of the present disclosure hereinafter with reference to the accompanying drawings is intended to explain the general inventive concept of the present disclosure, and should not be constructed as a limitation to the present disclosure.

In addition, in the following detailed description, for the sake of explanation, numerous specific details are set forth in order to provide a thorough understanding of the disclosed embodiments. It will be apparent, however, one or more embodiments may also be practiced without these specific details. In other instances, well-known structures and devices are illustrated schematically in order to simplify the drawing.

Figure 2:
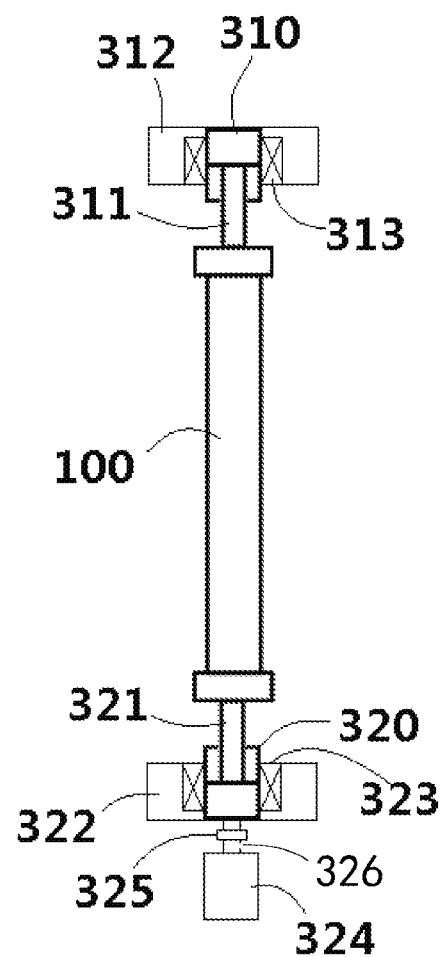
FIG. 2 is a schematic view of a holding and rotating mechanism of the painting system.

As shown in FIGS. 1 and 2, in an illustrated embodiment, a painting system 400 includes a conveying mechanism (11, 12, 13), a holding and rotating mechanism 30, and a robot 40. The conveying mechanism (11, 12, 13) is adapted to convey a workpiece 100 to be painted to a painting station. The holding and rotating mechanism 30 is mounted at the painting station and adapted to hold and rotate the workpiece 100. The robot 40 has a nozzle 43 adapted to spray paint onto the workpiece 100 held by the holding and rotating mechanism 30.

As shown in FIGS. 1 and 2, in the illustrated embodiment, the robot 40 sprays paint onto the workpiece 100 while the holding and rotating mechanism 30 rotates the workpiece 100, so as to spray a layer of paint on an outer surface of the workpiece 100.

As shown in FIGS. 1 and 2, in the illustrated embodiment, the holding and rotating mechanism 30 includes: a first holder 312, a first cylinder 310 rotatably mounted on the first holder 312 and having a first telescopic rod 311, a second holder 322, a second cylinder 320 rotatably mounted on the second holder 322 and having a second telescopic rod 321, and a servo motor 324 connected to one of the first cylinder 310 and the second cylinder 320.

As shown in FIGS. 1 and 2, in the illustrated embodiment, the first telescopic rod 311 of the first cylinder 310 and the second telescopic rod 321 of the second cylinder 320 are adapted to clamp the workpiece 100 from both ends of the workpiece 100. The servo motor 324 is adapted to drive the first cylinder 310, the second cylinder 320, and the clamped workpiece 100 to rotate together about an axis.

As shown in FIGS. 1 and 2, in the illustrated embodiment, the holding and rotating mechanism 30 further includes: a first bearing 313 by which the first cylinder 310 is rotatably mounted on the first holder 312; and a second bearing 323 by which the second cylinder 320 is rotatably mounted on the second holder 322. As shown in FIGS. 1 and 2, in the illustrated embodiment, the holding and rotating mechanism 30 further includes a coupling 325, by which an output shaft 326 of the servo motor 324 is connected to one of the first cylinder 310 and the second cylinder 320.

A speed at which the holding and rotating mechanism 30 rotates the workpiece 100 and a spraying rate for the nozzle 43 of the robot 40 are both controllable. Thus, a thickness of the paint layer sprayed on the outer surface of the workpiece 100 can be controlled by controlling the speed of the holding and rotating mechanism 30 and the spraying rate of the robot 40. In the embodiment shown in FIGS. 1 and 2, the holding and rotating mechanism 30 rotates the workpiece 100 at a uniform speed, and the spraying rate for the nozzle 43 of the robot 40 is kept constant to spray a layer of paint with uniform thickness on the outer surface of the workpiece 100. The holding and rotating mechanism 30 is adapted to drive the workpiece 100 to rotate about a vertical axis, and the robot 40 is adapted to move in a first horizontal direction perpendicular to the vertical axis and move in a second horizontal direction perpendicular to the first horizontal direction.

As shown in FIGS. 1 and 2, in the illustrated embodiment, the painting system 400 further includes a first slide rail 41 extending in the first horizontal direction and a second slide rail 42 extending in the second horizontal direction. The robot 40 is slidably mounted on the first slide rail 41, and the first slide rail 41 is slidably mounted on the second slide rail 42.

As shown in FIGS. 1 and 2, in the illustrated embodiment, the painting system 400 further includes a painting shield 31 mounted at the painting station. The painting shield 31 is configured to shield the workpiece 100 being sprayed and the nozzle 43 of the robot 40, so as to prevent the sprayed paint from spreading to an outside of the painting shield 31. In an embodiment, the painting system 400 further includes a vacuum suction device with a suction port communicating with the painting shield 31 for sucking and removing paint particles in the painting shield 31.

In the embodiment shown in FIGS. 1 and 2, the painting system 400 further includes a dust cleaning device 20 mounted at a dust cleaning station upstream of the painting station and configured to remove dust on the workpiece 100 before spraying it. In an embodiment, the dust cleaning device 20 is an electrostatic dust cleaning device, and the painting system 400 also includes a dust cleaning shield 21 configured to shield the electrostatic dust cleaning device 20 and the workpiece 100 from which dust is being removed so as to avoid explosion in case of static spark.

In the embodiment shown in FIGS. 1 and 2, the conveying mechanism (11, 12, 13) is adapted to convey the workpiece 100 carried thereon along a circular path. As shown in FIGS. 1 and 2, in the illustrated embodiment, the conveying mechanism (11, 12, 13) includes: a chain 11 adapted to move along a circular path, a plurality of gears 12, respectively located on a plurality of different positions of the circular path and configured to engage with the chain 11, and a plurality of trays 13 mounted on the chain 11 and evenly spaced apart from one another. The workpiece 100 is adapted to be carried on the tray 13. The gear 12 is adapted to drive the chain 11 to move. The chain 11 is adapted to drive the tray 13 and the workpiece 100 carried on the tray 13 to move together along the circular path. In the shown embodiment, the circular path is substantially rectangular, the number of gears 12 is four, and the four gears 12 are respectively arranged at inner sides of four corners of the circular path.

As shown in FIGS. 1 and 2, in the illustrated embodiment, the painting system 400 also includes an explosion-proof room 1 in which the conveying mechanism (11, 12, 13), the dust cleaning device 20, the holding and rotating mechanism 30 and the robot 40 are mounted. The explosion-proof room 1 has a safety door 1a at a loading and unloading station. An operator 2 can load an unpainted workpiece 100 to the conveying mechanism (11, 12, 13) through the safety door 1a, or unloaded the painted workpiece 100 from the conveying mechanism (11, 12, 13) and take it away.

As shown in FIGS. 1 and 2, in the illustrated embodiment, the painting system 400 also includes an electrical cabinet 3 placed outside of the explosion-proof room 1, thereby avoiding explosion otherwise caused by spark generated when operating the cabinet 3.

In the shown embodiment, the workpiece 100 is generally I-shaped. However, embodiments of the present disclosure are not limited to the illustrated embodiment. The embodiments of the present disclosure may be used for spraying workpieces 100 having various shapes, for example, a T-shape or cylindrical shape.

In the above exemplary embodiments of the present disclosure, the painting system 400 can automatically realize the painting work of the workpiece 100, and improve the efficiency and quality of painting the workpiece 100.

It should be appreciated by those skilled in the art that the above embodiments are intended to be illustrative; modifications may be made to the above embodiments by those skilled in the art, and structures described in various embodiments may be freely combined without conflicting in structure and principle.

Although the present disclosure has been described with reference to the attached drawings, the embodiments disclosed in the drawings are intended to illustrate embodiments of the present disclosure, but should not be constructed as a limitation to the present disclosure. Although some embodiments according to the general inventive concept of the present disclosure have been illustrated and described, it would be appreciated by those skilled in the art that various changes or modifications may be made in these embodiments without departing from the principles and spirit of the disclosure, the scope of which is not defined by the exemplary embodiments of the present disclosure, but defined in the claims and their equivalents.

It should be noted that term "comprising" or "including" should be understood as not excluding other elements or steps, and term "a" or "an" should be understood as not excluding plural elements or steps. Further, any reference numerals in claims should not be understood as a limitation to the present disclosure.

What is claimed is:

1. A painting system, comprising:
   a conveying mechanism adapted to continuously convey a workpiece to and from a painting station;
   a holding and rotating mechanism mounted at the painting station and adapted to hold and rotate the workpiece, the holding and rotating mechanism drives the workpiece to rotate about a vertical axis
   a robot having a nozzle adapted to spray a paint on the workpiece held by the holding and rotating mechanism, the robot is adapted to move in a first horizontal direction perpendicular to the vertical axis and to move in a second horizontal direction perpendicular to the first horizontal direction and is configured to spray the paint onto the workpiece while the holding and rotating mechanism rotates the workpiece, spraying a layer of the paint on an outer surface of the workpiece; and
   a first slide rail extending in the first horizontal direction and a second slide rail extending in the second horizontal direction, the robot is slidably mounted on the first slide rail, and the first slide rail is slidably mounted on the second slide rail.

2. The painting system of claim 1, wherein the holding and rotating mechanism includes a first holder, a first cylinder rotatably mounted on the first holder and having a first telescopic rod, a second holder, a second cylinder rotatably mounted on the second holder and having a second telescopic rod, and a servo motor connected to one of the first cylinder and the second cylinder.

3. The painting system of claim 2, wherein the first telescopic rod and the second telescopic rod clamp the workpiece from a pair of ends of the workpiece, the servo motor drives the first cylinder, the second cylinder, and the workpiece to rotate together about an axis.

4. The painting system of claim 3, wherein the holding and rotating mechanism includes a first bearing via which the first cylinder is rotatably mounted on the first holder, and a second bearing via which the second cylinder is rotatably mounted on the second holder.

5. The painting system of claim 3, wherein the holding and rotating mechanism includes a coupling by which an output shaft of the servo motor is connected to one of the first cylinder and the second cylinder.

6. The painting system of claim 1, wherein a speed at which the holding and rotating mechanism rotates the workpiece and a spraying rate for the nozzle of the robot are both controllable, a thickness of the layer of the paint sprayed on the outer surface of the workpiece is controlled by controlling the speed of the holding and rotating mechanism and the spraying rate of the robot.

7. The painting system of claim 6, wherein the holding and rotating mechanism rotates the workpiece at a uniform speed, and the spraying rate for the nozzle is kept constant to spray the layer of the paint with a uniform thickness on the outer surface of the workpiece.

8. The painting system of claim 1, further comprising a painting shield mounted at the painting station and shielding the workpiece being sprayed and the nozzle of the robot, preventing the paint from spreading to an outside of the painting shield.

9. The painting system of claim 8, further comprising a vacuum suction device having a suction port communicating with the painting shield and sucking and removing a plurality of paint particles within the painting shield.

10. The painting system of claim 1, further comprising a dust cleaning device mounted at a dust cleaning station upstream of the painting station and configured to remove dust from the workpiece before spraying the workpiece.

11. The painting system of claim 10, wherein the dust cleaning device is an electrostatic dust cleaning device, and further comprising a dust cleaning shield shielding the electrostatic dust cleaning device and the workpiece.

12. The painting system of claim 10, further comprising an explosion-proof room in which the conveying mechanism, the dust cleaning device, the holding and rotating mechanism, and the robot are mounted.

13. The painting system of claim 12, wherein the explosion-proof room has a safety door at a loading and unloading station, through which an operator loads an unpainted workpiece to the conveying mechanism or unloads and takes away a painted workpiece from the conveying mechanism.

14. The painting system of claim 12, further comprising an electrical cabinet placed outside of the explosion-proof room so as to avoid explosion in case of a spark generated when operating the electrical cabinet.

15. The painting system of claim 1, wherein the conveying mechanism conveys the workpiece along a circular path.

16. The painting system of claim 15, wherein the conveying mechanism includes a chain adapted to move along the circular path, a plurality of gears respectively located on a plurality of different positions of the circular path and engaging the chain, and a plurality of trays mounted on the chain and evenly spaced apart from one another.

17. The painting system of claim 16, wherein the workpiece is carried on one of the trays, the gears drive the chain to move, and the chain drives the trays and the workpiece carried on the one of the trays to move together along the circular path.

18. The painting system of claim 17, wherein the circular path is substantially rectangular, the plurality of gears are four gears, and the four gears are arranged at inner sides of four corners of the circular path.

19. A painting system, comprising:
a conveying mechanism adapted to continuously convey a workpiece to and from a painting station;
a holding and rotating mechanism mounted at the painting station and adapted to hold and rotate the workpiece;
a robot having a nozzle adapted to spray a paint on the workpiece held by the holding and rotating mechanism, the robot is configured to spray the paint onto the workpiece while the holding and rotating mechanism rotates the workpiece, spraying a layer of the paint on an outer surface of the workpiece; and
a dust cleaning device, the dust cleaning device is an electrostatic dust cleaning device, and further comprising a dust cleaning shield shielding the electrostatic dust cleaning device and the workpiece, the dust cleaning device mounted at a dust cleaning station upstream of the painting station and configured to remove dust from the workpiece before spraying the workpiece.

* * * * *